(12) United States Patent
Mueller et al.

(10) Patent No.: US 7,740,513 B2
(45) Date of Patent: Jun. 22, 2010

(54) METHOD AND DEVICE FOR MANUFACTURING A NOBLE METAL ARMORED ELECTRODE FOR A SPARKING PLUG

(75) Inventors: Helmut Mueller, Hessigheim (DE); Werner Niessner, Steinheim (DE)

(73) Assignee: Beru AG, Ludwigsburg (DE)

( * ) Notice: Subject to any disclaimer, the term of this patent is extended or adjusted under 35 U.S.C. 154(b) by 693 days.

(21) Appl. No.: 11/278,230

(22) Filed: Mar. 31, 2006

(65) Prior Publication Data

US 2006/0223406 A1    Oct. 5, 2006

(30) Foreign Application Priority Data

Apr. 4, 2005    (DE) .................... 10 2005 015 413

(51) Int. Cl.
    *H01T 21/02*    (2006.01)
(52) U.S. Cl. ........................................... 445/7
(58) Field of Classification Search ............ 445/7
    See application file for complete search history.

(56) References Cited

U.S. PATENT DOCUMENTS 4,810,220 A    3/1989    Moore
5,179,313 A    1/1993    Eves et al.
5,558,575 A *  9/1996    Chiu et al. ............... 445/7
6,595,818 B2   7/2003    Uehara
6,659,826 B2 * 12/2003   Hanai ....................... 445/7
6,827,620 B1   12/2004   Mizutani

FOREIGN PATENT DOCUMENTS

| GB | 2 176 163 A   |   | 12/1986 |
|----|---------------|---|---------|
| GB | 2 386 855 A   |   | 10/2003 |
| JP | 03149788 A    | * | 6/1991  |
| JP | 2002246143 A  | * | 8/2002  |

* cited by examiner

*Primary Examiner*—Mariceli Santiago
(74) *Attorney, Agent, or Firm*—David S. Safran; Roberts Mlotkowski Safran & Cole, P.C.

(57) ABSTRACT

Method and device for manufacturing a noble meal reinforced electrode for a spark plug. A base electrode element (1) is formed and positioned in a retaining attachment (2). A noble metal piece (3) is arranged by a suitable attachment (4) on the front side of the base electrode element (1), and pressed into the front side of the noble metal base element (1) by a press attachment, in particular a die (6), while the arrangement composed of the base electrode element (1) and noble metal piece (3) is preferably heated by an electric current. After cooling, subsequent pressing can be carried out, by which the noble metal piece (3) is pressed flat. It is also possible to weld together the noble metal piece (3) and the tip (7) of the base electrode element.

7 Claims, 2 Drawing Sheets

METHOD AND DEVICE FOR MANUFACTURING A NOBLE METAL ARMORED ELECTRODE FOR A SPARKING PLUG

BACKGROUND OF THE INVENTION

1. Field of the Invention

The invention relates to a method and a device for manufacturing a noble metal armored electrode for a spark plug.

2. Description of Related Art

European Patent Application EP 0 418 281 B1 and corresponding U.S. Pat. No. 4,810,220 disclose a method for manufacturing a noble metal armored electrode for a spark plug through a large number of different working steps which include the transport of intermediate products to several finishing stations, which means that the production process is generally expensive and associated with considerable production tolerances.

SUMMARY OF THE INVENTION

A primary object of the present invention is to provide a method and device of the type already mentioned, with which series production of noble metal armored electrodes of improved quality is possible.

This object is achieved according to the invention by a method and device by which a noble metal piece is placed on a front end of a base electrode element and is pressed into the base electrode element while controlling displacement.

In the method and device according to the invention an electrode base element is positioned in a work station and fixed there, and a piece of noble metal is then positioned by means of a feeding means on the tip of the base electrode element. After the base electrode element and the piece of noble metal arranged on it are heated, the noble metal piece is pressed into the base element. After cooling, the piece of noble metal is pressed flat by further pressing. In this process, the working steps of manufacturing the noble metal armored electrode take place either in a single work station or, in parallel, in several identical work stations, which shortens the cycle times. This guarantees better dimensional stability since the pressing-in of the piece of noble metal is not determined by the pressure but by displacement.

If, in addition, laser welding of the piece of noble metal is provided on the base electrode element, a longer service may be achieved.

A particularly preferred embodiment of the method and device according to the invention is described in greater detail in the following with reference to the accompanying drawings.

DETAILED DESCRIPTION OF THE INVENTION

Figure 1:
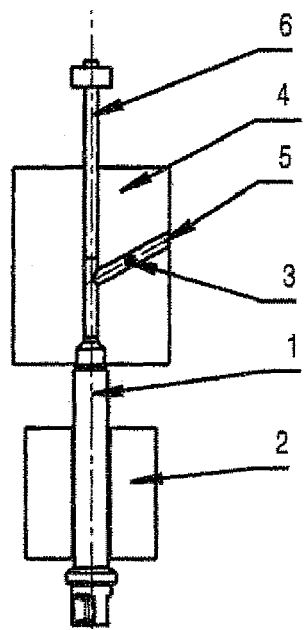
FIG. 1 shows a diagrammatic view of the embodiment of the device according to the invention in a first step of an embodiment of the method according to the invention.

The device for manufacturing a noble metal armored electrode shown in FIG. 1, comprises a retaining means 2 in which is arranged an electrode blank or base element 1 in the form of a cylindrical body, e.g., in the form of a piece of wire, and feeding means 4 for axially feeding a piece of noble metal 3, for example, a noble metal ball, to the tip of electrode blank 1, and for retaining a press die, in particularly a hold-down die 6, so that the press die is able to press the noble metal piece 3 against the tip or front of electrode blank 1.

Figure 2:
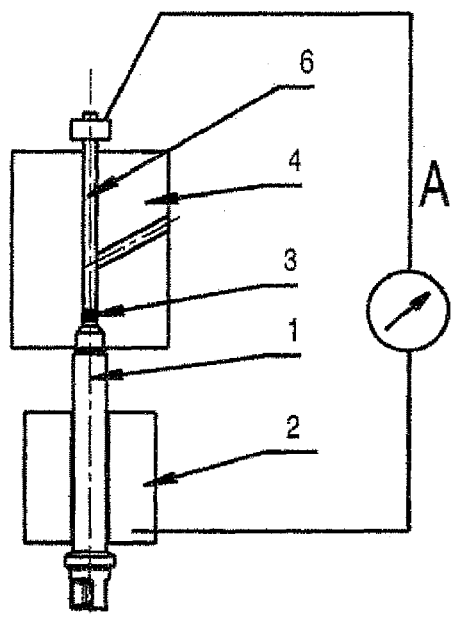
FIG. 2 is a diagrammatic view of the embodiment of the device according to the invention shown in FIG. 1, in a second step of the method according to the invention.

As shown in FIG. 2, provision is made for electric current to flow between retaining means 2 and the feeding means 4, and in particular, the press or hold-down die 6 arranged therein. The appropriate current supply A is shown in FIG. 2.

Figure 4:
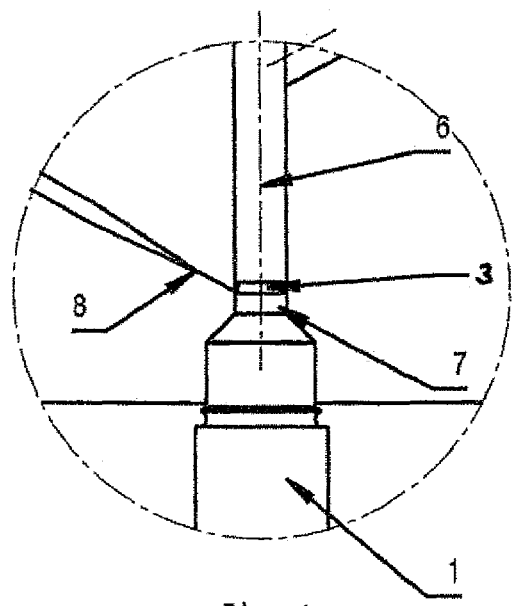
FIG. 4 is a diagrammatic partial view of the device in a fourth step of the method according to the invention.

The device shown in FIG. 1 may also comprise a laser welding means 8, which is represented in FIG. 4, and serves to weld together the noble metal piece 3 and the electrode tip 7.

The device described above operates according to the following process:

In a first process step, shown in FIG. 1, a prepared electrode blank or base element 1, for example, in the form of a piece of wire or other cylindrical body, is fixed in retaining means 2. The feeding means 4 is then positioned over the tip or front of electrode blank 1, so that a noble metal piece 3, for example, in the form of a ball or cylinder, can be guided to the electrode tip via feed duct 5 provided in the feeding means 4, or via another feed means, e.g., a gripping means or a vacuum retaining means. The noble metal piece 3 is then arranged on the tip, i.e., the front of electrode blank 1 where it can also be fixed thereto by laser welding.

In the next process step, shown in FIG. 2, the noble metal piece 3 is pressed onto the tip of electrode blank 1 by the press or hold-down die 1. An electric current is fed through electrode blank by means of the press or hold-down die 6, so that the electrode material begins to melt due to natural heating.

Figure 3:
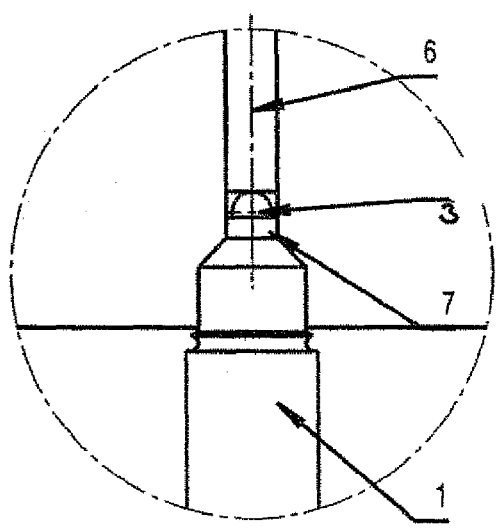
FIG. 3 is a diagrammatic partial view of the device in a third step of the method according to the invention.

During this current supply, or immediately after the electric current is switched off, the noble metal piece 3 is then pressed into the tip of electrode blank 1, as shown in FIG. 3. In this case, a predefined pressing-in distance is set to achieve the required dimensional accuracy. The pressing-in distance may be defined as an actual pressing-in distance, but it can be set to a functional dimension of the entire electrode, e.g., the distance from the sealing shoulder to the electrode tip. Such a functional dimension is particularly preferred in the case of subsequent pressing, since longitudinal tolerances of the electrode blank can be equalized thereby. The melted on electrode material is deposited on the surface of noble metal piece 3 and may form an alloy on the interface. After cooling, and hence solidification of the molten material, with the formation of an alloy on the interface, if necessary, noble metal piece 3 is also pressed flat by subsequent pressing to obtain a larger noble metal surface on electrode tip 7, as shown in FIG. 4.

During subsequent pressing, the pressing path is also limited to achieve high dimensional accuracy. As also shown in FIG. 4, the connection between noble metal piece 3 and electrode tip 7 can be further strengthened by a laser weld layer 8'.

Figure 5:
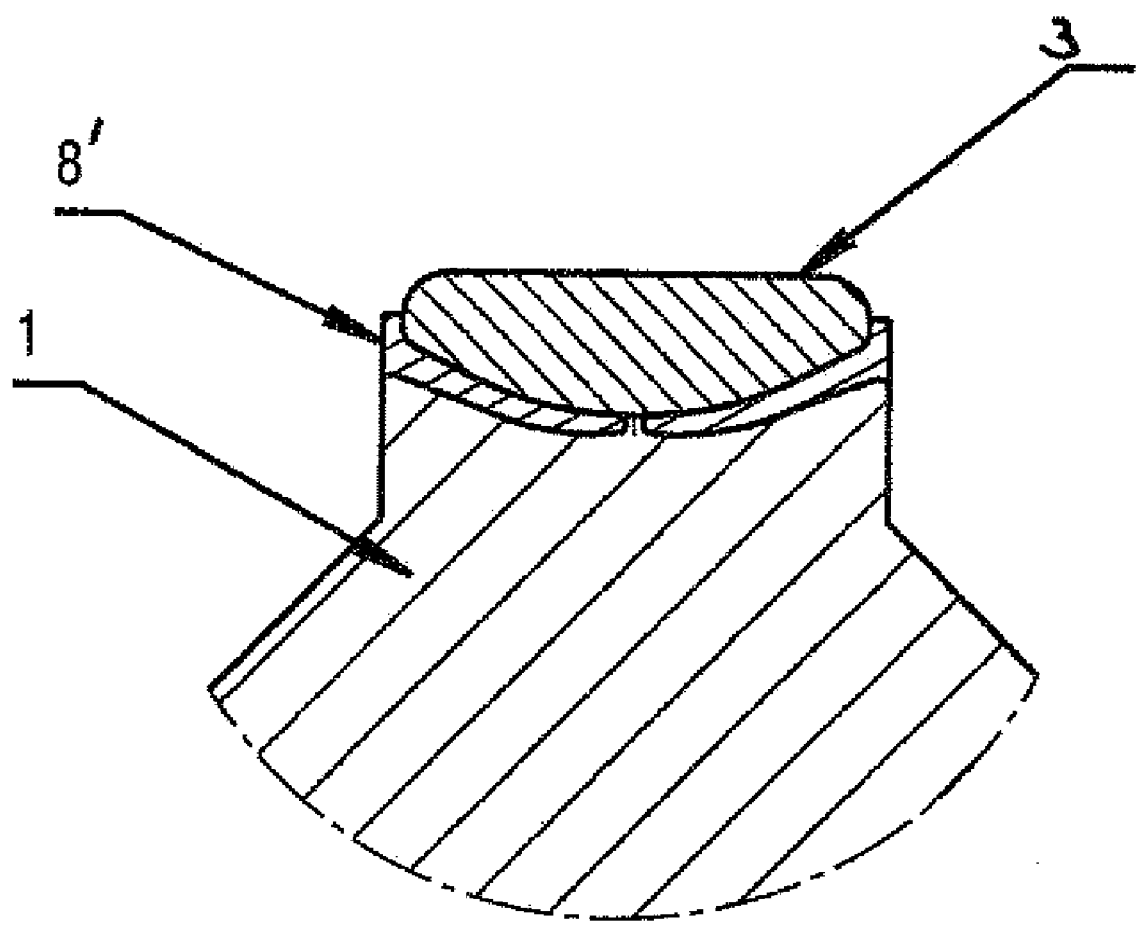
FIG. 5 is a sectional view through the tip of a noble metal armored electrode manufactured by the method according to the invention and with the device according to the invention.

FIG. 5 is a sectional view through the electrode tip of electrode blank 1 with the noble metal armor formed by the method described above from noble metal piece 3.

On the interface between both components 1, 3, an alloy weld layer 8' has been formed by laser welding on the circumference, which layer represents a mixture of the noble metal in noble metal piece 3 and the material of electrode blank 1. This alloy weld layer 8' serves not only for secure fastening, but also as a transitional zone of the coefficient of thermal expansion. This transitional zone reduces the stresses between the two materials under thermal load due to the different coefficients of thermal expansion that could lead to detachment of noble metal piece 3 after long-term use.

It is particularly advantageous for alloy layer to extend throughout the cross-section or at least over most of the cross-section of the noble metal armored electrode formed.

The electrode formed by the method described above may be further machined, e.g., by mold reduction on the electrode tip.

In the above, the method of the invention was described by taking the example of manufacturing the central electrode of a spark plug. It is understood that the method according to the invention can also be used to manufacture a mass electrode in different molds.

The shape of noble metal piece 3, which is fed to the tip of electrode blank 1 in the first process step, is not limited to the spherical shape described above and provided in preference. Noble metal piece 3 may be a small plate, a pipe section, a cylinder, a ring or a composite material formed of a noble metal and a non-noble metal.

The method according to the invention and the device according to the invention enable several working processes to be combined in one work station.

It is also possible to manufacture, e.g., machine the electrode in all positions, e.g., even horizontally.

What is claimed is:

1. A method for manufacturing a noble metal armored electrode for a spark plug, comprising the steps of:

forming a base electrode element, arranging a noble metal piece on a front side of the base electrode element, heating the base element and the noble metal piece arranged thereon, and pressing the noble metal piece into the base electrode element in a single pressing-in step while controlling the distance that the noble metal piece is pressed in, said distance being determined by the actual displacement of the noble piece into the base electrode and being equal to a predetermined value.

2. The method according to claim 1, wherein the noble metal piece is fed axially to the noble metal base element and is axially arranged on it.

3. The method according to claim 1, wherein the noble metal piece is pressed flat on the base electrode element in a subsequent pressing step.

4. The method according to claim 3, wherein the subsequent pressing step is carried out under while controlling the distance that the noble metal piece is pressed in to a predetermined value.

5. The method according to claim 1, wherein said heating step is performed by passing an electric current through both the base element and the noble metal piece.

6. The method according to claim 5, wherein the pressing step is performed after the electric current is switched off.

7. Method according to claim 1, wherein the noble metal piece is fixed by laser welding after being pressed into the base electrode element.

* * * * *